(12) United States Patent
Tauchi et al.

(10) Patent No.: US 9,987,885 B2
(45) Date of Patent: Jun. 5, 2018

(54) HEAVY DUTY PNEUMATIC TIRE

(71) Applicant: The Yokohama Rubber Co., LTD., Minato-ku, Toyko (JP)

(72) Inventors: Risa Tauchi, Hiratsuka (JP); Shoei Kakuta, Hiratsuka (JP); Hideki Hamanaka, Hiratsuka (JP); Yukihito Yamaguchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days. days.

(21) Appl. No.: 15/328,440

(22) PCT Filed: Jul. 23, 2015

(86) PCT No.: PCT/JP2015/070933
§ 371 (c)(1),
(2) Date: Jan. 23, 2017

(87) PCT Pub. No.: WO2016/013603
PCT Pub. Date: Jan. 28, 2016

(65) Prior Publication Data
US 2017/0217255 A1 Aug. 3, 2017

(30) Foreign Application Priority Data

Jul. 23, 2014 (JP) .................................. 2014-149824
May 13, 2015 (WO) .................. PCT/JP2015/063719

(51) Int. Cl.
*B60C 11/11* (2006.01)
*B60C 11/13* (2006.01)
(Continued)

(52) U.S. Cl.
CPC .......... *B60C 11/13* (2013.01); *B60C 11/0304* (2013.01); *B60C 11/0309* (2013.01);
(Continued)

(58) Field of Classification Search
CPC . B60C 11/0058; B60C 11/03; B60C 11/0008; B60C 11/0309;
(Continued)

(56) References Cited

U.S. PATENT DOCUMENTS

2007/0199633 A1 8/2007 Hayashi
2008/0078488 A1 4/2008 Yoda
(Continued)

FOREIGN PATENT DOCUMENTS

JP    H09-136514    5/1997
JP    2004-098914    4/2004
(Continued)

OTHER PUBLICATIONS

Machine translation of JP2010-095092 (no date).*
International Search Report for International Application No. PCT/JP2015/070933 dated Aug. 25, 2015, 4 pages, Japan.

*Primary Examiner* — Michael H Wilson
*Assistant Examiner* — Philip N Schwartz
(74) *Attorney, Agent, or Firm* — Thorpe North & Western

(57) ABSTRACT

A pneumatic tire with improved heat build-up resistance in a land portion in a tread center region. The pneumatic tire is provided with a tread pattern that includes a plurality of center lug grooves (14) disposed at intervals in a tire circumferential direction that cross a tire equator line; a plurality of shoulder lug grooves (12A, 12B) disposed in intervals between the plurality of center lug grooves in the tire circumferential direction extending outward in the tire width direction, an inner end in the tire width direction being disposed outward of an end of the center lug groove in the tire width direction; a pair of circumferential primary grooves (11A, 11B) extending around an entire circumference of the pneumatic tire in a wave-like shape with the ends of the center lug grooves and the inner ends of the plurality (Continued)

of shoulder lug grooves in the tire width direction alternately connecting to the pair of circumferential primary grooves (11A, 11B); and a circumferential secondary groove (10) disposed on the tire equator line around the entire circumference of the pneumatic tire that intersects the center lug grooves.

A straight line that joins an intersection portion between the center lug groove and the circumferential secondary groove and the end of the center lug groove has an inclination angle with respect to the tire circumferential direction ranging from 55° to 75°.

15 Claims, 8 Drawing Sheets

(51) Int. Cl.
*B60C 11/03* (2006.01)
*B60C 11/00* (2006.01)

(52) U.S. Cl.
CPC ....... *B60C 11/11* (2013.01); *B60C 2011/0025* (2013.01); *B60C 2011/0348* (2013.01); *B60C 2011/0351* (2013.01); *B60C 2200/065* (2013.01)

(58) Field of Classification Search
CPC ..... B60C 2011/0348; B60C 2011/0025; B60C 2011/0351; Y02T 10/862
See application file for complete search history.

(56) References Cited

U.S. PATENT DOCUMENTS

| | | | | |
|---|---|---|---|---|
| 2009/0032157 | A1* | 2/2009 | Inoue | B60O 11/0311 152/209.8 |
| 2014/0299242 | A1* | 10/2014 | Chauvin | B60O 11/032 152/209.8 |
| 2015/0047762 | A1* | 2/2015 | Shimizu | B60O 11/0008 152/209.5 |
| 2016/0332488 | A1* | 11/2016 | Araki | B60O 11/0311 |

FOREIGN PATENT DOCUMENTS

| | | | | |
|---|---|---|---|---|
| JP | 2004-224131 | | 8/2004 | |
| JP | 2006-151083 | | 6/2006 | |
| JP | 2007-191093 | | 8/2007 | |
| JP | 2008-279976 | | 11/2008 | |
| JP | 2010095092 A | * | 4/2010 | ......... B60C 11/0311 |
| JP | 2010-125999 | | 6/2010 | |
| WO | WO 2006/001202 | | 1/2006 | |
| WO | WO 2006/057169 | | 6/2006 | |
| WO | WO 2013140999 | * | 9/2013 | ......... B60C 11/0008 |
| WO | WO 2015107599 | * | 7/2015 | ......... B60C 11/0311 |

* cited by examiner

HEAVY DUTY PNEUMATIC TIRE

TECHNICAL FIELD

The present technology relates to a pneumatic tire with a tread pattern.

BACKGROUND ART

There is currently a demand for pneumatic tires to be improved in various performance areas. Such improvement may be realized through the design of tread patterns. Heavy duty tires have been provided with a tread pattern designed with improved traction performance in mind.

For example, a heavy duty pneumatic tire is known which improves both traction characteristics on bad roads until the terminal stage of wear and wet performance at high-speeds in a compatible manner (see Japanese Unexamined Patent Application Publication No. H09-136514A). This heavy duty pneumatic tire includes a tread provided with at least one circumferential primary groove extending in the circumferential direction, and a plurality of lateral grooves disposed on opposite sides of the circumferential primary groove at intervals in the circumferential direction. The plurality of lateral grooves are connected to the circumferential primary groove. The circumferential primary groove extends in the circumferential direction in a tread central region that corresponds to 50% of the tread width. The groove depth of the circumferential primary groove is 5% or greater of the tread width. The lateral grooves provided in at least the regions on opposite sides of the tread have a groove depth 109% or greater the groove depth of the circumferential primary groove.

In this heavy duty pneumatic tire, the area of the tread center region is made large so as to increase the cut resistance performance and wear resistance performance. However, a large tread center region land portion area leads to an increase in the amount of heat build-up, and a small groove area leads to a decrease in the amount of heat dissipated decreasing. As a result, heat build-up resistance is reduced.

SUMMARY

The present technology provides a heavy duty pneumatic tire capable of improving heat build-up resistance in the tread center region land portion.

An aspect of the present technology is a pneumatic tire including a tread portion provided with a tread pattern. The tread pattern includes a plurality of center lug grooves disposed at intervals in a tire circumferential direction that cross a tire equator line. The plurality of center lug grooves each include a first end located in a half-tread region on a first side in a tire width direction of the tire equator line, and a second end located in a half-tread region on a second side opposite the first side in the tire width direction.

The tread pattern further includes a plurality of shoulder lug grooves disposed in each spaces between the plurality of center lug grooves in the tire circumferential direction in both of the half-tread regions. Each of the plurality of shoulder lug grooves extend outward in the tire width direction and include an outer end in the tire width direction that opens to a ground contact edge on one side of respective opposite sides in the tire width direction, and an inner end in the tire width direction located outward in the tire width direction of a position in the tire width direction of the respective first end or the second end.

The tread pattern further includes a pair of circumferential primary grooves with a groove width less than that of the plurality of shoulder lug grooves, each of the pair of circumferential primary grooves being disposed in the respective half-tread regions and extending around an entire circumference of the pneumatic tire while alternately connecting to either one of the first end and the second end, and the inner end of each of the plurality of shoulder lug grooves in the tire width direction to form a wave-like shape.

The tread pattern further includes a plurality of center blocks formed in a row in the tire circumferential direction and defined by the plurality of center lug grooves and the pair of circumferential primary grooves, and a circumferential secondary groove disposed on the tire equator line around the entire circumference of the pneumatic tire that intersects the plurality of center lug grooves.

A straight line that joins the first end and a first intersection portion where the center lug groove intersects a groove wall of the circumferential secondary groove on the first side has an inclination angle with respect to the tire circumferential direction ranging from 55 to 75°, and a straight line that joins the second end and a second intersection portion where the center lug groove intersects a groove wall of the circumferential secondary groove on the second side has an inclination angle with respect to the tire circumferential direction ranging from 55 to 75°.

A groove width W1 of the circumferential secondary groove preferably ranges from 7 mm to 60 mm.

A relationship W1/W2 preferably ranges from 1.0 to 8.5, where W1 is a groove width of the circumferential secondary groove and W2 is a groove width of the center lug grooves.

A raised bottom portion is preferably provided in each of the pair of circumferential primary grooves which is a portion where groove depth becomes shallower partially.

A relationship $D1/T<0.05$ is preferably satisfied, where D1 is a groove depth of the raised bottom portion and T is a tread width of the tread portion in the tire width direction.

A relationship $0.2 \leq D2/D3 \leq 1.0$ is preferably satisfied, where D2 is a maximum depth of the circumferential secondary groove and D3 is a maximum depth of the center lug grooves.

A relationship $0.05 \leq W1/A \leq 1.0$ is preferably satisfied, where A is a lateral variation of the wave-like shape of each of the pair of circumferential primary grooves and W1 is a groove width of the circumferential secondary groove.

A ratio R of a groove area to a ground contact region of the tread portion when the pneumatic tire is inflated with air to a standard air pressure (700 kPa) and loaded with a standard load (617.81 kN) is preferably such that $R \leq 0.35$.

A relationship $0.30 \leq W3/T < W4/T \leq 0.60$ is preferably satisfied, where W3 is an interval in the tire width direction between opposite ends of each of the center lug grooves, W4 is an interval in the tire width direction between the inner end in the tire width direction of each of the shoulder lug grooves disposed in one of the half-tread regions and the inner end in the tire width direction of each of the shoulder lug grooves disposed in the other half-tread region, and T is a tread width of the tread portion in the tire width direction.

A rubber of an outermost portion of the tread portion in a tire radial direction preferably has a ratio (tan δ) of loss modulus to storage modulus at 60° C. ranging from 0.04 to 0.2.

Each of the plurality of center blocks preferably comprises corner portions formed corresponding to each of the pair of circumferential primary grooves, and the corners portions have obtuse angles.

A groove width of the pair of circumferential primary groove and a groove width of the plurality of center lug groove preferably range from 7 mm to 20 mm.

A closed groove extending in the tire width direction is preferably disposed in regions on the ground contact edge side of the pair of circumferential primary grooves, wherein both ends of the closed groove are spaced apart from the pair of circumferential primary grooves and the plurality of shoulder lug grooves.

The heavy duty pneumatic tire can be applied to a construction vehicle or an industrial vehicle.

The plurality of center lug grooves each preferably include a first groove turning portion disposed on the first side that bends or curves protruding out toward a third side in the tire circumferential direction, and a second groove turning portion disposed on the second side that bends or curves protruding out toward a fourth side opposite the third side in the tire circumferential direction.

An inclination angle with respect to the tire width direction of a first straight line that joins the first end and a protruding end where the first groove turning portion protrudes toward the third side in the tire circumferential direction and an inclination angle with respect to the tire width direction of a second straight line that joins the second end and a protruding end where the second groove turning portion protrudes toward the fourth side in the tire circumferential direction are greater than an inclination angle with respect to the tire width direction of a third straight line that joins the first end and the second end of each of the center lug grooves, the straight lines following center positions in a groove width direction of the center lug grooves.

The plurality of center lug grooves each preferably include a first groove turning portion disposed on the first side that bends or curves protruding out toward a third side in the tire circumferential direction, and a second groove turning portion disposed on the second side that bends or curves protruding out toward a fourth side opposite the third side in the tire circumferential direction.

The first groove turning portion is provided at the first intersection portion, and the second groove turning portion is provided at the second intersection portion.

According to the tire described above, heat build-up resistance can be improved in a land portion located in a tread center region.

DETAILED DESCRIPTION

A pneumatic tire according to an embodiment of the present technology is described below in detail with reference to the accompanying drawings.

"Tire width direction" in the present technology refers to the direction of the center axis of rotation of the pneumatic tire. "Tire circumferential direction" refers to the direction in which the rotating surface of the tread surface rotates, the rotating surface being formed when a tire 1 rotates about the center axis of rotation of the tire. "Tire radial direction" refers to the direction extending radially out from the center axis of rotation of the tire. "Outward in the tire radial direction" refers to the direction away from the center axis of rotation of the tire relative to the object of comparison. "Inward in the tire radial direction" refers to the direction towards the center axis of rotation of the tire relative to the object of comparison. "Outward in the tire width direction" refers to the direction away from the tire equator line in the tire width direction relative to the object of comparison. "Inward in the tire width direction" refers to the direction toward the tire equator line in the tire width direction relative to the object of comparison.

"Heavy duty tire" in the present specification includes tires for vehicle type 1 (dump truck, scraper), type 2 (grader), type 3 (shovel loader, etc.), type 4 (tire roller), and a mobile crane (truck crane, wheel crane) as specified according to the Japan Automobile Tyre Manufacturers Association, Inc. (JATMA) Year Book 2014, Chapter D, and a tire for vehicles as specified according to Tire and Rim Association, Inc. (TRA) Year Book 2013, Section 4 and Section 6. The heavy duty pneumatic tire according to the present embodiment may be mounted on a construction vehicle or an industrial vehicle described above, for example. Examples of construction vehicles and industrial vehicles include a dump truck, scraper, grader, shovel loader, tire roller, wheel crane, truck crane, as well as a compactor, earth mover, grader, loader, and dozer.

Figure 1:
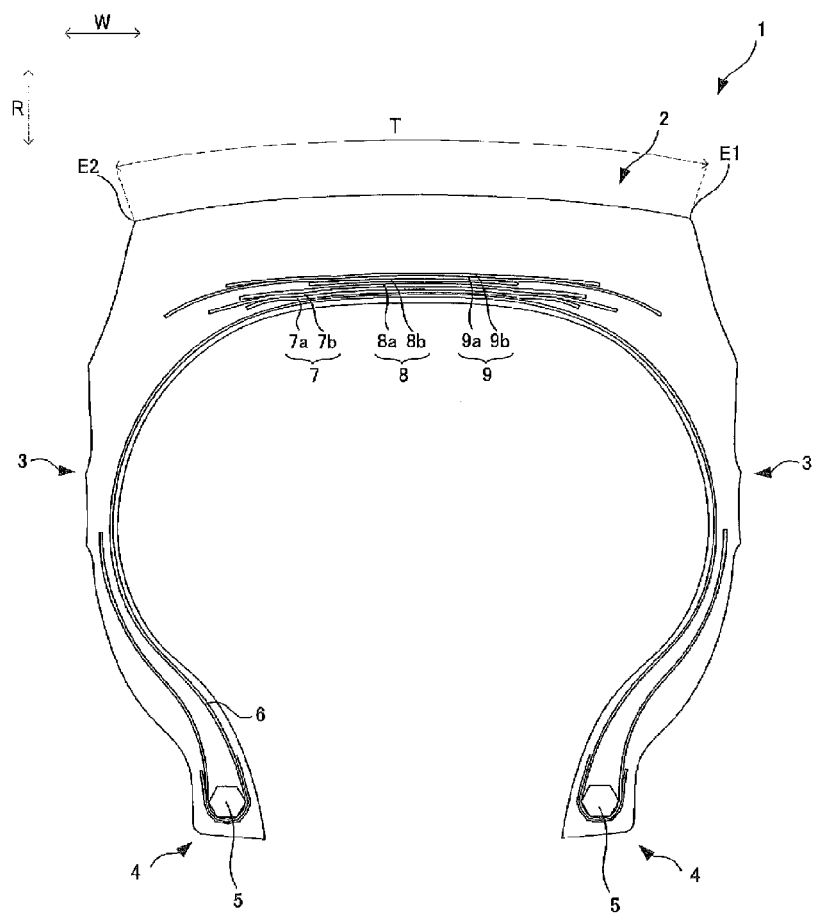
FIG. 1 is a cross-sectional view of an example of a pneumatic radial tire according to the present embodiment.

FIG. 1 is a cross-sectional view of the pneumatic radial tire of the present embodiment (referred to simply as "tire" below) along a plane that passes through the tire rotation axis. In FIG. 1, the tire radial direction is denoted by R and the tire width direction is denoted by W.

The tire 1 illustrated in FIG. 1 includes a tread portion 2, sidewall portions 3, and bead portions 4. The bead portions 4 on opposite sides in the tire width direction each include a bead core 5. A carcass layer 6 is laid between the pair of bead portions 5. The carcass layer 6 is turned up at both end portions at the bead cores 5 from in to out.

In the tread portion 2, on the outer periphery side of the carcass layer 6, a first cross belt layer 7, a second cross belt layer 8, and a third cross belt layer 9 are disposed in that order from inward to outward in the tire radial direction. The first cross belt layer 7 is made of two belts 7a, 7b. The second cross belt layer 8 is made of two belts 8a, 8b. The third cross belt layer 9 is made of two belts 9a, 9b. Each belt 7a, 7b, 8a, 8b, 9a, 9b includes reinforcing cords inclined with respect to the tire circumferential direction. The inclination angle of the reinforcing cords with respect to the tire circumferential direction is preferably from 18 degrees to 24 degrees.

The first cross belt layer 7 illustrated in FIG. 1 has a configuration in which the belt 7a is located inward in the tire radial direction and the belt 7b is located outward of the belt 7a in the tire radial direction. The width of the belt 7a in the tire width direction is less than the width of the belt 7b in the tire width direction. The reinforcing cords of the belt 7a and belt 7b are inclined in opposite directions with respect to the tire circumferential direction so that the directions of the reinforcing cords intersect.

The second cross belt layer 8 illustrated in FIG. 1 has a configuration in which the belt 8a is located inward in the tire radial direction and the belt 8b is located outward of the belt 8a in the tire radial direction. The width of the belt 8a in the tire width direction is greater than the width of the belt 8b in the tire width direction. The reinforcing cords of the belt 8a and belt 8b are inclined in opposite directions with respect to the tire circumferential direction so that the directions of the reinforcing cords intersect.

The third cross belt layer 9 illustrated in FIG. 1 has a configuration in which the belt 9a is located inward in the tire radial direction and the belt 9b is located outward of the belt 9a in the tire radial direction. The width of the belt 9a in the tire width direction is greater than the width of the belt 9b in the tire width direction. The reinforcing cords of the belt 9a and belt 9b are inclined in opposite directions with respect to the tire circumferential direction so that the directions of the reinforcing cords intersect.

The configuration including the belts 7a, 7b, 8a, 8b, 9a, 9b illustrated in FIG. 1 is one possible example. The widths of the belts 7a, 7b, 8a, 8b, 9a, 9b are not particularly limited. Three cross belt layers 7, 8, 9 are provided in FIG. 1, however in some embodiments only two cross belt layers may be provided, and the configuration of the belts are not particularly limited. Additionally, a sheet-like cushioning material (a rubber layer, for example) may be provided in sections between the belts 7a, 7b, 8a, 8b, 9a, 9b.

A single or a plurality of rubber layers that compose the tread portion 2 are disposed outward of the first cross belt layer 7, the second cross belt layer 8, and the third cross belt layer 9 in the tire radial direction. The rubber of the outermost portion of the tread portion 2 in the tire radial direction has a ratio (tan δ) of loss modulus to storage modulus at 60° C. preferably ranging from 0.04 to 0.2.

Such a configuration is but one possible example of the tire 1 and other known configuration may be employed.

Tread Pattern

Figure 2:
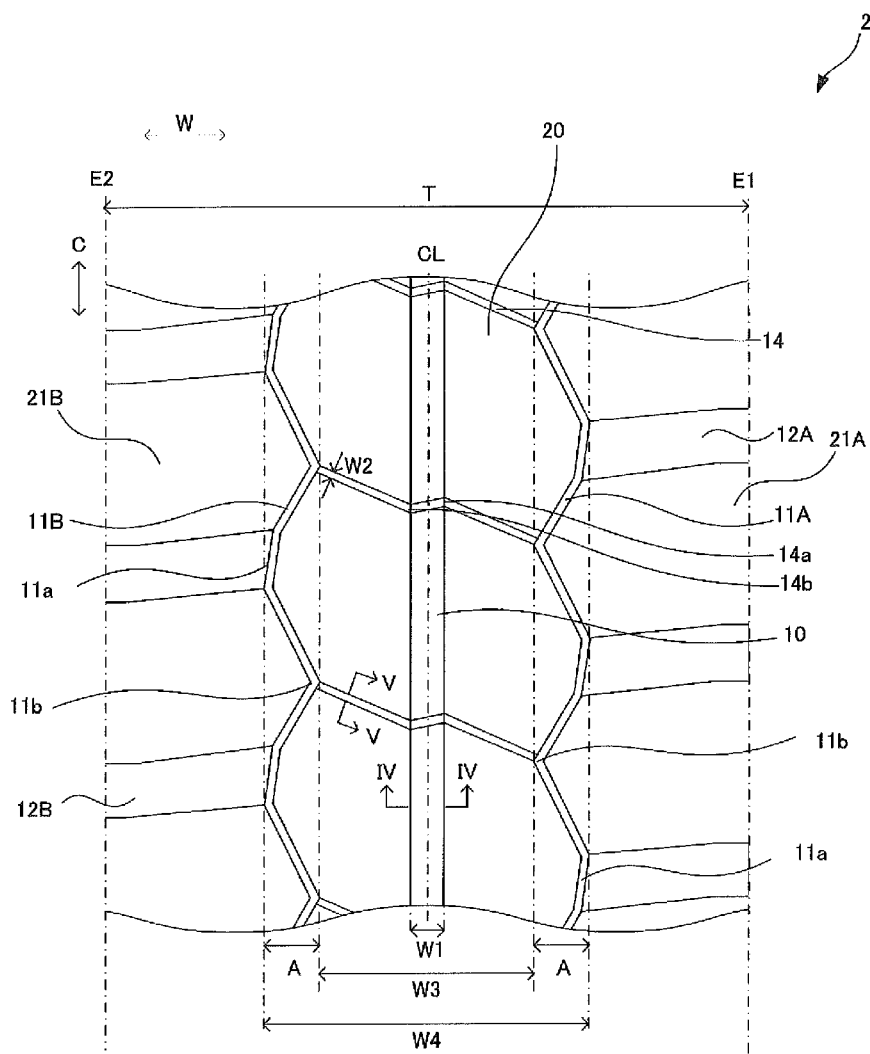
FIG. 2 is a developed plan view illustrating a tread pattern provided on a tread portion of the tire according to the present embodiment.

FIG. 2 is a developed plan view illustrating a tread pattern provided on the tread portion 2 of the tire 1 according to the present embodiment. In FIG. 2, the tire circumferential direction is denoted by C and the tire width direction is denoted by W.

The tread portion 2 is provided with a tread pattern that includes a circumferential secondary groove 10, a pair of circumferential primary grooves 11A, 11B, a plurality of shoulder lug grooves 12A, 12B, and a plurality of center lug grooves 14. Note that in the present embodiment, the tread pattern of the tread portion 2 has point symmetry with respect to a point of intersection between any center lug groove 14 and the tire equator line CL.

A plurality of the center lug grooves 14 are disposed at intervals in the tire circumferential direction. The center lug grooves 14 cross the tire equator line CL and extend in the half-tread regions of opposite sides of the tire equator line CL in the tire width direction to two ends. The center lug grooves 14 connect the circumferential primary groove 11A disposed in one of the half-tread regions (the half-tread region from the tire equator line CL to one of the tread edges E1) and the circumferential primary groove 11B disposed in the other half-tread region (the half-tread region from the tire equator line CL to the other tread edge E2).

Note that the tread edges E1, E2 (ground contact edges) are points of intersection between the extension line of the external form of the tread portion 2 and the extension line of the external form of the side portion 3. In embodiments in which the portions where the tread portion 2 and the side portion 3 connect are not rounded, the portions where the external forms of the tread portion 2 and the side portion 3 connect correspond to tread edges E1, E2, as illustrated in FIG. 1. A tread width T is the distance between the tread edges E1, E2.

Figure 3:
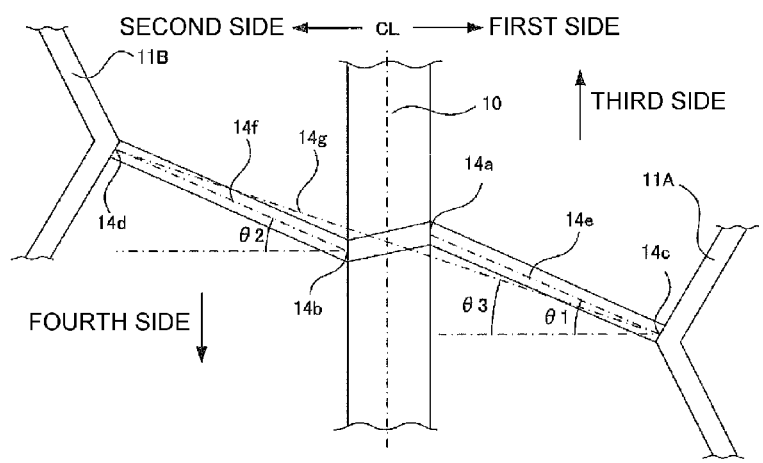
FIG. 3 is an enlarged view of a center lug groove.

FIG. 3 is an enlarged view of the center lug groove 14. As illustrated in FIG. 3, the center lug groove 14 intersects the circumferential secondary groove 10. In the present embodiment, the end portion of the center lug groove 14 on the side proximal to the circumferential primary groove 11A (first side) is defined as a first end 14c, the end portion proximal to the circumferential primary groove 11B (second side) is defined as a second end 14d, the portion where the center lug groove 14 intersects the groove wall of the circumferential secondary groove 10 on the first side is defined as a first intersection portion 14a, the portion where the center lug groove 14 intersects with the groove wall of the circumferential secondary groove 10 on the second side is defined as a second intersection portion 14b, the straight line that joins the center position of the first end 14c in the groove width direction and the center position of the first intersection portion 14a in the groove width direction is defined as a first straight line 14e, the straight line that joins the center position of the second end 14d in the groove width direction and the center position of the second intersection portion 14b in the groove width direction is defined as a second straight line 14f, and the straight line that joins the center position of the first end 14c in the groove width direction and the center position of the second end 14d in the groove width direction is defined as a third straight line 14g.

The inclination angle of the first straight line 14e with respect to the tire circumferential direction and the inclination angle of the second straight line 14f with respect to the tire circumferential direction preferably ranges from 55 to 75°. In other words, θ1 and θ2 preferably range from 15 to 35°, where θ1 is an inclination angle of the first straight line 14e with respect to the tire width direction and θ2 (0°≤θ2≤90°) is an inclination angle of the second straight line 14f with respect to the tire width direction.

Note that the position of the first end 14c and the position of second end 14d are offset from each other in the tire circumferential direction, and the center lug groove 14 is inclined with respect to the tire equator line CL. The direction in the tire circumferential direction in which the second end 14d is located relative to the first end 14c is defined as the third side, and the direction in the tire circumferential direction in which the first end 14c is located relative to the second end 14d is defined as the fourth side. The third side is the upper side in FIG. 3 and the fourth side is the lower side. The first intersection portion 14a is preferably located on the third side relative to the third straight line 14 g, and the second intersection portion 14b is preferably located on the fourth side relative to the third straight line 14g. In other words, relationships θ1>θ3 and θ2>θ3 are preferably satisfied, where θ3 (0°≤θ3≤90°) is an inclination angle of the third straight line 14g with respect to the tire width direction.

The center lug groove 14 has a narrower width than the shoulder lug grooves 12A, 12B.

The center lug groove 14 preferably forms an obtuse angle with the circumferential primary groove 11A and the circumferential primary groove 11B. In other words, corner portions of connection portions 11b of a circumferential row of center blocks 20 defined by the center lug groove 14 and the pair of circumferential primary grooves 11A, 11B preferably have an obtuse angle. By the angle formed by the center lug groove 14 and the circumferential primary grooves 11A, 11B being obtuse, the corner portions of the center blocks 20 are given sufficient rigidity. As a result, elastic deformation at the corner portions of the center blocks 20 can be suppressed, and thus heat build-up caused by elastic deformation can be suppressed.

The center lug groove 14 is provided with a first groove turning portion with a bent or curved shape at the first intersection portion 14a and a second groove turning portion with a bent or curved shape at the second intersection portion 14b. The first groove turning portion is preferably disposed on the first side, with the bend or curve protruding out toward the third side. The second groove turning portion is preferably disposed on the second side, with the bend or curve protruding out toward the fourth side. The first groove turning portion and the second groove turning portion are described below with the first groove turning portion being denoted by the same reference sign 14a as the first intersection portion, and the second groove turning portion being denoted by the same reference sign 14b as the second intersection portion.

By disposing the groove turning portions 14a, 14b in such a manner, tread rigidity of the center blocks 20 can be increased.

In other words, when the center blocks 20 separate from the road surface and are kicked back and when the center blocks 20 experience collapse deformation caused by shear force in the tire circumferential direction acting on the center blocks 20 due to the interaction with the road surface, center blocks 20 adjacent in the circumferential direction interlock at the groove turning portions 14a, 14b of the center lug grooves 14 and function integrally to produce a counter force. As a result, tread rigidity of the center blocks 20 can be increased. By increasing tread rigidity of the center blocks 20, the center blocks 20 can be prevented from collapsing. Thus localized wear in the center blocks 20 on opposite sides in the tire circumferential direction of the center lug groove 14 can be suppressed.

The shoulder lug grooves 12A, 12B are disposed in each of spaces between the center lug grooves 14 in the tire circumferential direction. The shoulder lug groove 12A, in one of the half-tread regions, extends outward in the tire width direction and in one direction in the tire rotation direction C (upward in FIG. 2) and opens to the tread edge E1. The shoulder lug groove 12B, in the other half-tread region, extends outward in the tire width direction and the other direction in the tire rotation direction C (downward in FIG. 2) and opens to the tread edge E2.

The position in the tire width direction of the inward ends of the shoulder lug grooves 12A, 12B in the tire width direction are located outward from the positions in the tire width direction of the ends of the center lug groove 14 in the tire width direction.

The inner end portions of the shoulder lug grooves 12A, 12B in the tire width direction have a wider groove width than the circumferential primary grooves 11A, 11B.

In the half-tread region on the first side (the half-tread region between the tire equator line CL and the tread edge E1), the circumferential primary groove 11A extends around the entire circumference of the tire while alternately connecting to the first end of the center lug groove 14 and the inner end of the shoulder lug groove 12A in the tire width direction to form a wave-like shape.

In the half-tread region on the second side (the half-tread region between the tire equator line CL and the tread edge E2), the circumferential primary groove 11B extends around the entire circumference of the tire while alternately connecting to the second end of the center lug groove 14 and the inner end of the shoulder lug groove 12B in the tire width direction to form a wave-like shape.

Here, the circumferential primary grooves 11A, 11B having a "wave-like shape" refers to sinuous shape in which the circumferential primary grooves 11A, 11B change position in the tire width direction as they extend in the circumferential direction.

The circumferential primary groove 11A extends around the entire circumference of the tire in a wave-like shape with connection portions (turning out portions 11a) where the circumferential primary groove 11A and the inner end of the shoulder lug groove 12A in the tire width direction are connected and connection portions (turning out portions 11b) where the circumferential primary groove 11A and the first end of the center lug groove 14 are connected being disposed in an alternating arrangement in the tire circumferential direction. The turning out portion 11a is turned so that the circumferential primary groove 11A protrudes outward in the tire width direction. The turning out portion 11b is turned so that the circumferential primary groove 11A protrudes inward in the tire width direction.

The circumferential primary groove 11B extends around the entire circumference of the tire in a wave-like shape with connection portions (turning out portions 11a) where the circumferential primary groove 11B and the inner end of the shoulder lug groove 12B in the tire width direction are connected and connection portions (turning out portions 11b) where the circumferential primary groove 11B and the second end of the center lug groove 14 are connected being disposed in an alternating arrangement in the tire circumferential direction. The turning out portion 11a is turned so that the circumferential primary groove 11B protrudes outward in the tire width direction. The turning out portion 11b is turned so that the circumferential primary groove 11B protrudes inward in the tire width direction.

The circumferential primary grooves 11A, 11B may have an angled shape at the turning out portions 11a, 11b or may have a rounded curved shape. An angled shape includes a shape that bends at a predetermined radius of curvature. Additionally, the portions of the circumferential primary grooves 11A, 11B other than the turning out portions 11a, 11b may have a rectilinear shape or a curved shape. In embodiments in which the turning out portions 11a, 11b and the portions other than the turning out portions 11a, 11b have a curved shape, the curved shapes may have the same radius of curvature. Additionally, one of two turning out portions 11a, 11b adjacent in the tire circumferential direction may be a bent shaped turning out portion formed by a connected rectilinear shaped groove and curved shaped groove and the other may be a curved shaped turning out portion.

The circumferential primary grooves 11A, 11B have a narrower groove width than the shoulder lug grooves 12A, 12B. The width of the circumferential primary grooves 11A, 11B preferably ranges from 7 mm to 20 mm, for example.

The position of the turning out portion 11a of the circumferential primary groove 11A in the tire circumferential direction is offset from the position of the turning out portion 11a of the circumferential primary groove 11B in the tire circumferential direction. In other words, the turning out portion 11a of the circumferential primary groove 11A and the turning out portion 11a of the circumferential primary groove 11B have an alternating arrangement in the tire circumferential direction.

In a similar manner, the position of the turning out portion 11b of the circumferential primary groove 11A in the tire circumferential direction is offset from the position of the turning out portion 11b of the circumferential primary groove 11B in the tire circumferential direction. In other words, the position of the turning out portion 11b of the circumferential primary groove 11A in the tire circumferential direction is between the positions of the turning out portions 11b of the circumferential primary groove 11B in the tire circumferential direction. Accordingly, the wave-like shape of the circumferential primary groove 11A is out of phase with the wave-like shape of the circumferential primary groove 11B.

Corner portions are preferably formed in the center blocks 20 corresponding to the circumferential primary grooves 11A, 11B. These corner portions preferably have an obtuse angle. By the corner portions of the center blocks 20 having an obtuse angle, sufficient rigidity in the corner portions of the center blocks 20 can be obtained. As a result, elastic deformation of the corner portions of the center blocks 20 can be suppressed, and thus heat build-up caused by such elastic deformation can be suppressed. Additionally, by the bend angle at the turning out portion 11b being obtuse, sufficient rigidity in the corner portion of the outer blocks of the turn out portion 11b in the tire width direction can be obtained. As a result, elastic deformation of the corner portions of the blocks can be suppressed, and thus heat build-up caused by such elastic deformation can be suppressed.

The circumferential secondary groove 10 extends annularly in the tire circumferential direction along the tire equator line CL. The circumferential secondary groove 10 preferably has a groove width W1 ranging from 7 mm to 60 mm. If W1 is less than 7 mm, the excessively narrow circumferential secondary groove 10 reduces breathability, and the decreased groove surface area reduces heat dissipation. If W1 is greater than 60 mm, rigidity of the center blocks 20 surrounded by the circumferential primary grooves 11A, 11B and the center lug grooves 14 decreases.

A relationship $1.0 \leq W1/W2 \leq 8.5$ is preferably satisfied, where W2 is the maximum width of the center lug grooves 14. If W1/W2 is less than 1.0, the excessively narrow circumferential secondary groove 10 reduces breathability, and the decreased groove surface area reduces heat dissipation. If W1/W2 is greater than 8.5, the excessively narrow width of the center lug grooves 14 relative to the width of the center lug groove 14 reduces breathability from the circumferential secondary groove 10 to the center lug grooves 14, and thus heat dissipation is reduced. The width of the center lug grooves 14 preferably ranges from 7 mm to 20 mm, for example.

Figure 4:
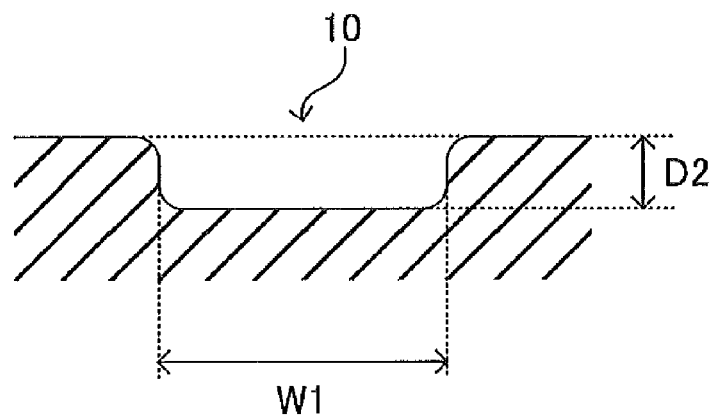
FIG. 4 is a cross-sectional view taken along the line IV-IV of FIG. 2.
Figure 5:
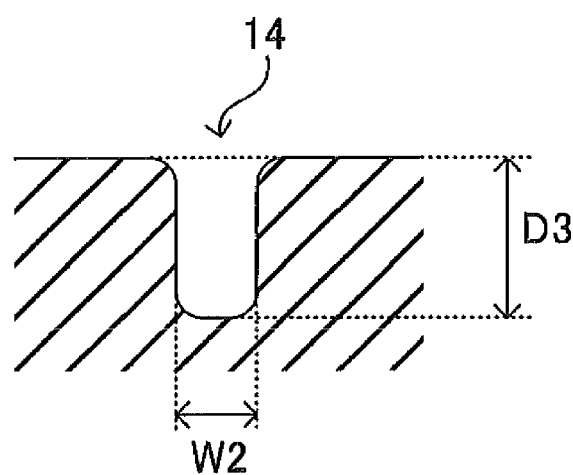
FIG. 5 is a cross-sectional view taken along the line V-V of FIG. 2.

FIG. 4 is a cross-sectional view of the circumferential secondary groove 10. FIG. 5 is a cross-sectional view of the center lug groove 14. A relationship $0.2 \leq D2/D3 \leq 1.0$ is preferably satisfied, where D2 is the maximum groove depth of the circumferential secondary groove 10 as illustrated in FIG. 4 and D3 is the maximum groove depth of the center lug groove 14 as illustrated in FIG. 5. If D2/D3 is less than 0.2, heat dissipation performance cannot be sufficiently provided by the center lug grooves 14. If D2/D3 is greater than 1.0, rigidity in the center blocks 20 decreases. From the perspective of heat dissipation performance, the relationship D2<D3 is preferably satisfied. If D2 is less than D3, a portion of the air that flows through the center lug grooves 14 flows through the circumferential secondary groove 10. As a result, heat dissipation performance provided by the circumferential secondary groove 10 can be increased.

A relationship $0.30 \leq W3/T < W4/T \leq 0.60$ is preferably satisfied, where W3 is the interval in the tire width direction between the turning out portion 11b that connects to the center lug groove 14 of the circumferential primary groove 11A and the turning out portion 11b that connects to the center lug groove 14 of the circumferential primary groove 11B, W4 is the interval in the tire width direction between the turning out portion 11a that connects to the shoulder lug groove 12A of the circumferential primary groove 11A and the turning out portion 11a that connects to the shoulder lug groove 12B of the circumferential primary groove 11B, and T is the tread width in the tire width direction of the tread portion 2. "Tread width T" refers to the length between the tread edges E1, E2 along the external form of the tread portion 2. If W3/T is less than 0.30, the shoulder lug grooves 12A, 12B, which have a wider width than the center lug groove 14, become long. As a result, ground contact area of the tread portion 2 cannot be sufficiently ensured. If W4/T is greater than 0.60, the amount of heat build-up at the center blocks 20 becomes greater than the amount of heat dissipated.

A relationship $0.05 \leq W1/A \leq 1.0$ is preferably satisfied, where A is the lateral variation of the circumferential primary grooves 11A, 11B. Here, "lateral variation of the circumferential primary grooves 11A, 11B" refers to the distance in the tire width direction between the outermost position in the tire width direction of the turning out portion 11a of the circumferential primary grooves 11A, 11B and the innermost position in the tire width direction of the turning out portion 11b. If W1/A is less than 0.05, rigidity in the center blocks 20 decreases, and the amount of heat build-up caused by elastic deformation of the center blocks 20 increases. If W1/A is greater than 1.0, groove area of the circumferential primary grooves 11A, 11B increases. As a result, ground contact area of the tread portion 2 cannot be sufficiently ensured.

Additionally, the circumferential primary grooves 11A, 11B are preferably provided with a raised bottom portion 11c which is a portion where the groove depth is shallow.

Figure 6:
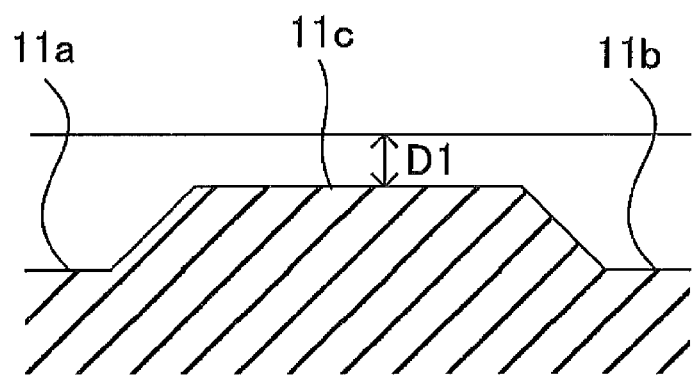
FIG. 6 is a view illustrating an example of a raised bottom portion in a circumferential primary groove of the tire according to the present embodiment.

FIG. 6 is a cross-sectional view of an example of the circumferential primary groove 11A provided with the raised bottom portion 11c illustrating the region between the turning out portion 11a and the turning out portion 11b. Note that in a similar manner, the circumferential primary groove 11B may also be provided with the raised bottom portion 11c. As illustrated in FIG. 6, the raised bottom portion 11c is provided between the turning out portion 11a and the turning out portion 11b. In FIG. 6, the depth of the circumferential primary grooves 11A is at a maximum at the turning out portion 11a and the turning out portion 11b. The depth of the raised bottom portion 11c is less than that of the turning out portion 11a and the turning out portion 11b. The depth of the circumferential primary grooves 11A, 11B at the deepest portion is preferably the same as that of the shoulder lug grooves 12A, 12B.

By providing the raised bottom portion 11c in the circumferential primary grooves 11A, 11B, rigidity of a shoulder block 21A surrounded by the shoulder lug grooves 12A and the circumferential primary groove 11A, center blocks 20, and a shoulder block 21B surrounded by the shoulder lug grooves 12B and the circumferential primary groove 11B is increased. As a result, the amount of deformation of the shoulder block 21A, center blocks 20, and the shoulder block 21B decreases, and thus the amount of heat produced due to deformation can be reduced.

Note that the turning out portion 11a and the turning out portion 11b may also be provided with the raised bottom portion 11c. Additionally, the deepest groove depth of the circumferential primary grooves is preferably the same as the groove depth of the shoulder lug grooves 12.

The depth of the raised bottom portion 11c may be uniform, or the depth may vary within a range that does not go below the depth of the deepest groove depth. For example, in one embodiment, the raised bottom portion 11c may become shallower in a stepwise manner from the deepest depth portion of the circumferential primary grooves 11A, 11B. In another embodiment, the raised bottom portion 11c may continuously become shallower from the deepest depth portion.

In such embodiments, a relationship D1/T<0.05 is preferably satisfied, where D1 is the shallowest groove depth of the raised bottom portion 11c.

If D1/T is equal to or greater than 0.05, the effect of the raised bottom portion 11c of suppressing the amount of deformation cannot be sufficiently obtained. D1/T is preferably greater than 0.02 to ensure breathability of the circumferential primary grooves 11A, 11B.

In such a manner, by providing the circumferential secondary groove extending annularly in the tire circumferential direction along the tire equator line CL and setting the inclination angle of the portion of the center lug grooves 14 between the circumferential primary grooves 11A, 11B and the circumferential secondary groove 10 with respect to the tire circumferential direction in a range from 55° to 75°, the flow of air from the circumferential primary grooves to the circumferential secondary groove and from the circumferential secondary groove to the center lug grooves is improved. As a result, heat dissipation performance of the center blocks 20 can be improved and heat build-up resistance performance can be improved.

Note that in FIGS. 2 and 3, the portion of the center lug groove 14 between the circumferential primary grooves 11A, 11B and the circumferential secondary groove 10 is rectilinear, but the portion may be bent or curved. In such embodiments, all of the portions of the center lug groove 14 between the circumferential primary grooves 11A, 11B and the circumferential secondary groove 10 preferably have an inclination angle such that the minimum value and the maximum value both range from 55° to 75° to ensure a good flow of air from the circumferential secondary groove to the center lug grooves.

Modified Example

Figure 7:
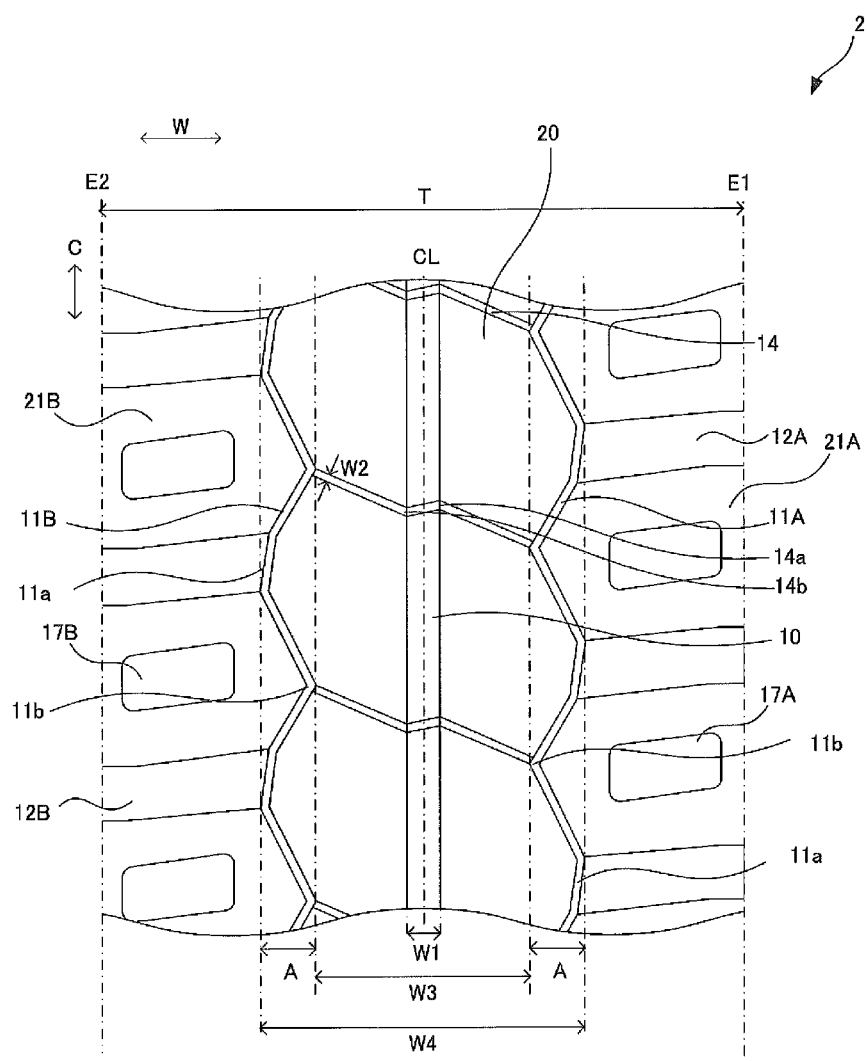
FIG. 7 is a developed plan view illustrating a modified example of the tread pattern of the tire according to the present embodiment.

FIG. 7 is a developed plan view illustrating a modified example of the tread patterns illustrated in FIG. 2. As illustrated in FIG. 7, a closed groove 17A is provided in a region between two shoulder lug grooves 12A adjacent in the circumferential direction on the side of the circumferential primary groove 11A proximal to the tread edge E1 or ground contact edge. The closed groove 17A includes ends spaced apart from the circumferential primary groove 11A and the shoulder lug grooves 12A and extends in the tire width direction.

Additionally, a closed groove 17B is provided in a region between two shoulder lug grooves 12B adjacent in the circumferential direction on the side of the circumferential primary groove 11B proximal to the tread edge E2 or ground contact edge. The closed groove 17B includes ends spaced apart from the circumferential primary groove 11B and the shoulder lug grooves 12B and extends in the tire width direction.

By providing the closed grooves 17A, 17B in such a manner, surface area of the shoulder blocks 21A, 21B is increased. As a result, heat dissipation performance and heat build-up resistance performance can be improved.

Working Examples, Conventional Example, Comparative Examples

To examine the effects of a tire according to the present embodiment, test tires with varying tread patterns were manufactured and the heat build-up resistance performance of each was tested. The size of the test tires was 46/90R57. Indoor drum testing was performed on the test tires after being mounted to TRA specified rims with a rim size of 29.00-6.0, inflated to an air pressure of 700 kPa (TRA specified air pressure), and loaded with 110% of the standard maximum load of 63000 kg so as to comply with test conditions. Starting at a speed of 5 km/h, the speed was increased by 1 km/h every 12 hours and the running time up until when the tire failed due to heat build-up was measured. Heat build-up resistance performance was evaluated with the results being expressed as index values and the running time of the conventional example being defined as 100.

Test tires according to a Conventional Example, Comparative Examples 1 to 2, and Working Examples 1 to 29 were manufactured.

Figure 8:
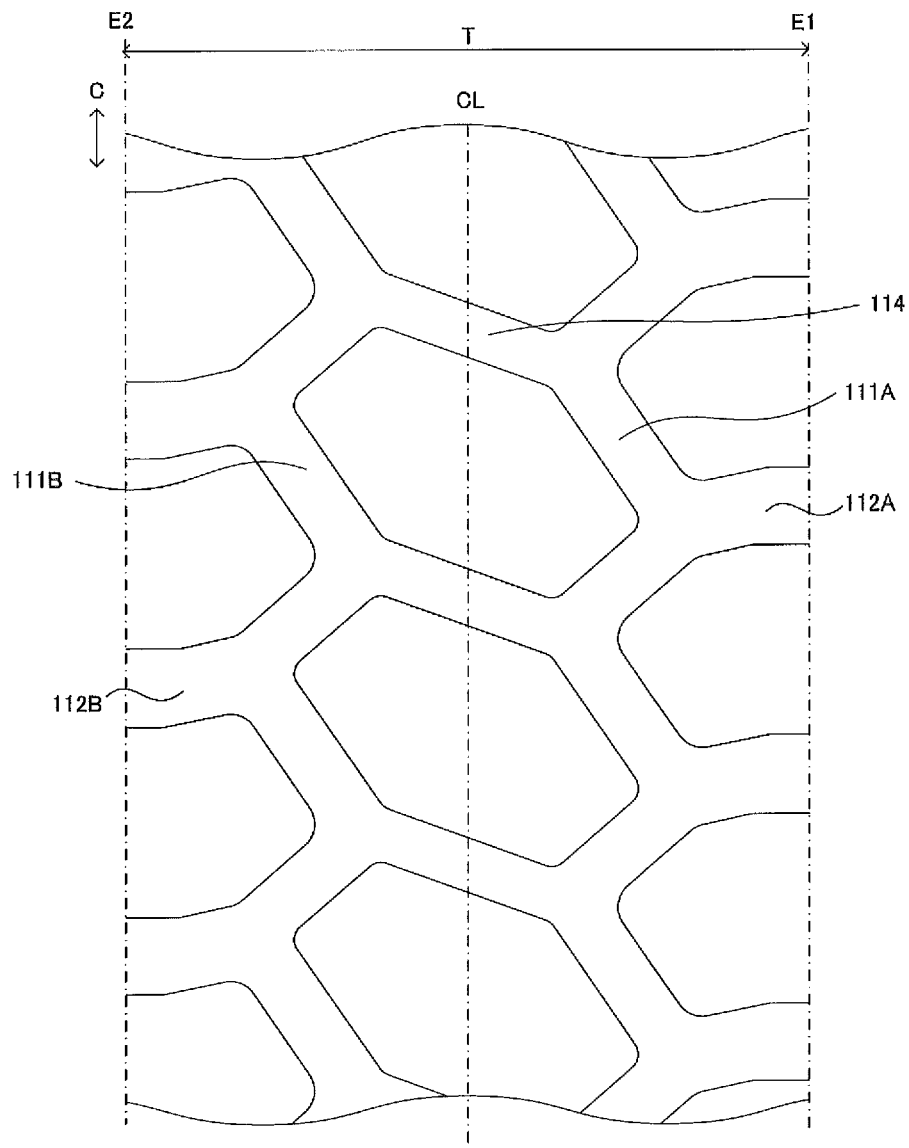
FIG. 8 is a view illustrating a tread pattern of a tire according to a conventional example.

FIG. 8 is a diagram illustrated the tread pattern of the Conventional Example. The tread pattern illustrated in FIG. 8 is provided with a pair of circumferential primary grooves 111A, 111B, shoulder lug grooves 112A, 112B, and center lug grooves 114. The circumferential primary grooves 111A, 111B, the shoulder lug grooves 112A, 112B, and the center lug grooves 114 have the same configuration as their counterparts the circumferential primary groove 11A, 11B, the shoulder lug grooves 12A, 12B, and the center lug grooves 14. Additionally, the width of the circumferential primary grooves 111A, 111B and the shoulder lug grooves 112A, 112B is the same as that of the shoulder lug grooves 12A, 12B. A closed groove is not provided in the land portion surrounded by the circumferential primary grooves 111A, 111B and the center lug grooves 114.

Working Example 1 employs the tread pattern illustrated in FIG. 2 except that the center lug grooves are not provided with a groove turning portion. Working Example 2 employs the tread pattern illustrated in FIG. 2 except that θ3 is less than θ1 and θ2, the first groove turning portion protrudes to the fourth side, and the second groove turning portion protrudes to the third side. Working Examples 3 to 30 and Comparative Examples 1 to 3 employed the tread pattern illustrated in FIG. 2 or FIG. 7.

The configuration of the components and the evaluation results for heat build-up resistance performance of the tread pattern are shown in Tables 1 and 2.

TABLE 1

|  | Conventional Example | Comparative Example | | Working Example | |
| --- | --- | --- | --- | --- | --- |
|  |  | 1 | 2 | 1 | 2 |
| Circumferential primary groove turning out portion | Present | Present | Present | Present | Present |

TABLE 1-continued

| | Conventional Example | Working Example | | | |
|---|---|---|---|---|---|
| | | | | | |
| Circumferential secondary groove | Absent | Present | Present | Present | Present |
| θ1 (=θ2)(°) | 45 | 45 | 5 | 35 | 35 |
| θ3(°) | 45 | 35 | 0 | 35 | 45 |
| W1 (mm) | — | 5 | 5 | 5 | 5 |
| W1/W2 | — | 0.8 | 0.8 | 0.8 | 0.8 |
| Raised bottom portion | Absent | Absent | Absent | Absent | Absent |
| D1/T | — | — | — | — | — |
| D2/D3 | — | 0.1 | 0.1 | 0.1 | 0.1 |
| W1/A | — | 1.2 | 1.2 | 1.2 | 1.2 |
| W3/T | 0.4 | 0.4 | 0.4 | 0.4 | 0.4 |
| W4/T | 0.65 | 0.65 | 0.65 | 0.65 | 0.65 |
| tanδ | 0.25 | 0.25 | 0.25 | 0.25 | 0.25 |
| Heat build-up resistance | 100 | 101 | 101 | 103 | 104 |

| | Conventional Example | Working Example | | | |
|---|---|---|---|---|---|
| | | 3 | 4 | 5 | 6 |
| Circumferential primary groove turning out portion | Present | Present | Present | Present | Present |
| Circumferential secondary groove | Absent | Present | Present | Present | Present |
| θ1 (=θ2)(°) | 45 | 35 | 25 | 15 | 25 |
| θ3(°) | 45 | 25 | 15 | 5 | 15 |
| W1 (mm) | — | 5 | 5 | 5 | 7 |
| W1/W2 | — | 0.8 | 0.8 | 0.8 | 1.0 |
| Raised bottom portion | Absent | Absent | Absent | Absent | Absent |
| D1/T | — | — | — | — | — |
| D2/D3 | — | 0.1 | 0.1 | 0.1 | 0.1 |
| W1/A | — | 1.2 | 1.2 | 1.2 | 1.2 |
| W3/T | 0.4 | 0.4 | 0.4 | 0.4 | 0.4 |
| W4/T | 0.65 | 0.65 | 0.65 | 0.65 | 0.65 |
| tanδ | 0.25 | 0.25 | 0.25 | 0.25 | 0.25 |
| Heat build-up resistance | 100 | 105 | 106 | 105 | 107 |

| | Conventional Example | Working Example | | | |
|---|---|---|---|---|---|
| | | 7 | 8 | 9 | 10 |
| Circumferential primary groove turning out portion | Present | Present | Present | Present | Present |
| Circumferential secondary groove | Absent | Present | Present | Present | Present |
| θ1 (=θ2)(°) | 45 | 25 | 25 | 25 | 25 |
| θ3(°) | 45 | 15 | 15 | 15 | 15 |
| W1 (mm) | — | 40 | 60 | 70 | 40 |
| W1/W2 | — | 4.0 | 8.5 | 10 | 4.0 |
| Raised bottom portion | Absent | Absent | Absent | Absent | Present |
| D1/T | — | — | — | — | 0.01 |
| D2/D3 | — | 0.1 | 0.1 | 0.1 | 0.1 |
| W1/A | — | 1.2 | 1.2 | 1.2 | 1.2 |
| W3/T | 0.4 | 0.4 | 0.4 | 0.4 | 0.4 |
| W4/T | 0.65 | 0.65 | 0.65 | 0.65 | 0.65 |
| tanδ | 0.25 | 0.25 | 0.25 | 0.25 | 0.25 |
| Heat build-up resistance | 100 | 110 | 109 | 106 | 111 |

| | Conventional Example | Working Example | | | |
|---|---|---|---|---|---|
| | | 11 | 12 | 13 | 14 |
| Circumferential primary groove turning out portion | Present | Present | Present | Present | Present |
| Circumferential secondary groove | Absent | Present | Present | Present | Present |
| θ1 (=θ2)(°) | 45 | 25 | 25 | 25 | 25 |
| θ3(°) | 45 | 15 | 15 | 15 | 15 |
| W1 (mm) | — | 40 | 40 | 40 | 40 |
| W1/W2 | — | 4.0 | 4.0 | 4.0 | 4.0 |
| Raised bottom portion | Absent | Present | Present | Present | Present |
| D1/T | — | 0.02 | 0.03 | 0.05 | 0.07 |
| D2/D3 | — | 0.1 | 0.1 | 0.1 | 0.1 |
| W1/A | — | 1.2 | 1.2 | 1.2 | 1.2 |
| W3/T | 0.4 | 0.4 | 0.4 | 0.4 | 0.4 |
| W4/T | 0.65 | 0.65 | 0.65 | 0.65 | 0.65 |
| tanδ | 0.25 | 0.25 | 0.25 | 0.25 | 0.25 |
| Heat build-up resistance | 100 | 112 | 113 | 112 | 111 |

TABLE 2

| | Working Example | | | | | |
|---|---|---|---|---|---|---|
| | 15 | 16 | 17 | 18 | 19 | 20 |
| Circumferential primary groove turning out portion | Present | Present | Present | Present | Present | Present |
| Circumferential secondary groove | Present | Present | Present | Present | Present | Present |
| θ1 (=θ2)(°) | 25 | 25 | 25 | 25 | 25 | 25 |
| θ3(°) | 15 | 15 | 15 | 15 | 15 | 15 |
| W1 (mm) | 40 | 40 | 40 | 40 | 40 | 40 |
| W1/W2 | 6.0 | 6.0 | 6.0 | 6.0 | 6.0 | 6.0 |
| Raised bottom portion | Present | Present | Present | Present | Present | Present |
| D1/T | 0.03 | 0.03 | 0.03 | 0.03 | 0.03 | 0.03 |
| D2/D3 | 0.2 | 0.5 | 1.0 | 1.2 | 0.5 | 0.5 |
| W1/A | 1.2 | 1.2 | 1.2 | 1.2 | 0.03 | 0.05 |
| W3/T | 0.4 | 0.4 | 0.4 | 0.4 | 0.4 | 0.4 |
| W4/T | 0.65 | 0.65 | 0.65 | 0.65 | 0.65 | 0.65 |
| tanδ | 0.25 | 0.25 | 0.25 | 0.25 | 0.25 | 0.25 |
| Heat build-up resistance | 114 | 115 | 114 | 113 | 115 | 116 |

| | Working Example | | | | |
|---|---|---|---|---|---|
| | 21 | 22 | 23 | 24 | 25 |
| Circumferential primary groove turning out portion | Present | Present | Present | Present | Present |
| Circumferential secondary groove | Present | Present | Present | Present | Present |
| θ1 (=θ2)(°) | 25 | 25 | 25 | 25 | 25 |
| θ3(°) | 15 | 15 | 15 | 15 | 15 |
| W1 (mm) | 40 | 40 | 40 | 40 | 40 |
| W1/W2 | 6.0 | 6.0 | 6.0 | 6.0 | 6.0 |
| Raised bottom portion | Present | Present | Present | Present | Present |
| D1/T | 0.03 | 0.03 | 0.05 | 0.05 | 0.05 |
| D2/D3 | 0.5 | 0.5 | 0.5 | 0.5 | 0.5 |
| W1/A | 0.08 | 0.1 | 0.08 | 0.08 | 0.08 |
| W3/T | 0.4 | 0.4 | 0.25 | 0.3 | 0.35 |
| W4/T | 0.65 | 0.65 | 0.4 | 0.4 | 0.4 |
| tanδ | 0.25 | 0.25 | 0.25 | 0.25 | 0.25 |
| Heat build-up resistance | 117 | 116 | 117 | 118 | 119 |

| | Working Example | | | | |
|---|---|---|---|---|---|
| | 26 | 27 | 28 | 29 | 30 |
| Circumferential primary groove turning out portion | Present | Present | Present | Present | Present |
| Circumferential secondary groove | Present | Present | Present | Present | Present |
| θ1 (=θ2)(°) | 25 | 25 | 25 | 25 | 25 |
| θ3(°) | 15 | 15 | 15 | 15 | 15 |
| W1 (mm) | 40 | 40 | 40 | 40 | 40 |
| W1/W2 | 6.0 | 6.0 | 6.0 | 6.0 | 6.0 |
| Raised bottom portion | Present | Present | Present | Present | Present |
| D1/T | 0.05 | 0.05 | 0.05 | 0.05 | 0.05 |
| D2/D3 | 0.5 | 0.5 | 0.5 | 0.5 | 0.5 |
| W1/A | 0.08 | 0.08 | 0.08 | 0.08 | 0.08 |
| W3/T | 0.35 | 0.35 | 0.35 | 0.35 | 0.35 |

TABLE 2-continued

| W4/T | 0.6 | 0.4 | 0.4 | 0.4 | 0.4 |
|---|---|---|---|---|---|
| tan δ | 0.25 | 0.02 | 0.04 | 0.15 | 0.2 |
| Heat build-up resistance | 118 | 119 | 120 | 121 | 120 |

In comparing the Conventional Example and Working Example 1, it is seen that by providing the circumferential secondary groove, heat build-up resistance performance is improved. In comparing the Conventional Example, Comparative Examples 1 and 2, and Working Examples 1 to 5, it is seen that by setting the inclination angle of the center lug grooves with respect to the tire circumferential direction ranges from 55° to 75°, heat build-up resistance performance is further improved.

In comparing Comparative Example 2 and Working Examples 1 to 4, it is seen that when the inclination angle of the center lug grooves with respect to the tire circumferential direction ranges from 55° to 75°, heat build-up resistance performance can be further improved.

In comparing Working Examples 4 and 6 to 9, it is seen that when the width W1 of the circumferential secondary groove ranges from 7 mm to 60 mm, heat build-up resistance performance can be further improved. Additionally, it is seen that when the ratio W1/W2 between the width W1 of the circumferential secondary groove and the width W2 of the center lug grooves ranges from 1.0 to 8.5, heat build-up resistance performance can be further improved.

In comparing Working Examples 7 and 10, it is seen that by providing the raised bottom portion, heat build-up resistance performance can be further improved. Additionally, in comparing Working Examples 10 to 14, it is seen that when the ratio D1/T between the depth D1 of the shallowest portion of the raised bottom portion and the tread width T ranges from 0.02 to 0.05, heat build-up resistance performance can be further increased.

In comparing Working Examples 12 and 15 to 18, it can be seen that when the ratio D2/D3 between the maximum groove depth D2 of the circumferential secondary groove and the maximum groove depth D3 of the center lug grooves ranges from 0.2 to 1.0, heat build-up resistance performance can be further increased.

In comparing Working Examples 16 and 19 to 22, it is seen that when the ratio W1/A between the width W1 of the circumferential secondary groove and the lateral variation A of the circumferential primary groove 11A, 11B ranges from 0.05 to 1.0, heat build-up resistance performance can be increased.

In comparing Working Examples 21 and 23 to 26, it can be seen that when the ratio W3/T between the interval W3 in the tire width direction between the turning out portion 11b of the circumferential primary groove 11A and the turning out portion 11b of the circumferential primary groove 11B and the tread width T is equal to or greater than 0.30, and when the ratio W4/T between the interval W4 in the tire width direction between the turning out portion 11a of the circumferential primary groove 11A and the turning out portion 11a of the circumferential primary groove 11B and the tread width T is equal to or less than 0.60, heat build-up resistance performance can be increased.

In comparing Working Examples 25 and 27 to 30, it is seen that when the ratio (tan δ) of loss modulus to storage modulus at 60° C. of rubber of the outermost portion of the tread portion 2 in the tire radial direction ranges from 0.04 to 0.2, heat build-up resistance performance can be further increased.

This clearly demonstrates the effect of the present embodiment.

The foregoing has been a detailed description of the pneumatic tire of the present technology. However, the present technology is not limited to the above embodiments, and may be improved or modified in various ways within the scope of the present technology.

The invention claimed is:

1. A heavy duty pneumatic tire comprising:
a tread portion that is provided with a tread pattern, the tread pattern comprising:
a plurality of center lug grooves disposed at intervals in a tire circumferential direction that cross a tire equator line, the plurality of center lug grooves each comprising
a first end located in a half-tread region on a first side in a tire width direction of the tire equator line, and
a second end located in a half-tread region on a second side opposite the first side in the tire width direction;
a plurality of shoulder lug grooves disposed in each space between the plurality of center lug grooves in the tire circumferential direction in both of the half-tread regions,
each of the plurality of shoulder lug grooves extending outward in the tire width direction and comprising
an outer end in the tire width direction that opens to a ground contact edge on one side of respective opposite sides in the tire width direction, and
an inner end in the tire width direction located outward in the tire width direction of a position in the tire width direction of the respective first end or the second end;
a pair of circumferential primary grooves with a groove width less than that of the plurality of shoulder lug grooves, each of the pair of circumferential primary grooves being disposed in the respective half-tread regions and extending around an entire circumference of the pneumatic tire while alternately connecting to either one of the first end and the second end, and the inner end of each of the plurality of shoulder lug grooves in the tire width direction to form a wave-like shape;
a plurality of center blocks formed in a row in the tire circumferential direction and defined by the plurality of center lug grooves and the pair of circumferential primary grooves; and
a circumferential secondary groove disposed on the tire equator line around the entire circumference of the pneumatic tire that intersects the plurality of center lug grooves; wherein
a straight line that joins the first end and a first intersection portion where the center lug groove intersects a groove wall of the circumferential secondary groove on the first side has an inclination angle with respect to the tire circumferential direction ranging from 55° to 75°;
a straight line that joins the second end and a second intersection portion where the center lug groove intersects a groove wall of the circumferential secondary groove on the second side has an inclination angle with respect to the tire circumferential direction ranging from 55° to 75°;
a ratio of a groove width of the circumferential secondary groove to a maximum groove width of the center lug grooves ranges from 1.0 to 8.5; and
a relationship 0.05≤W1/A≤1.0 is satisfied, where A is a lateral variation of the wave-like shape of each of the pair of circumferential primary grooves and W1 is a groove width of the circumferential secondary groove.

2. The heavy duty pneumatic tire according to claim 1, wherein a groove width W1 of the circumferential secondary groove ranges from 7 mm to 60 mm.

3. The heavy duty pneumatic tire according to claim 1, wherein a relationship W1/W2 ranges from 1.0 to 8.5, where W1 is a groove width of the circumferential secondary groove and W2 is a groove width of the center lug grooves.

4. The heavy duty pneumatic tire according to claim 1, further comprising a raised bottom portion in each of the pair of circumferential primary grooves which is a portion where groove depth becomes shallower partially.

5. The heavy duty pneumatic tire according to claim 4, wherein a relationship D1/T<0.05 is satisfied, where D1 is a groove depth of the raised bottom portion and T is a tread width of the tread portion in the tire width direction.

6. The heavy duty pneumatic tire according to claim 1, wherein a relationship $0.2 \leq D2/D3 \leq 1.0$ is satisfied, where D2 is a maximum depth of the circumferential secondary groove and D3 is a maximum depth of the center lug grooves.

7. The heavy duty pneumatic tire according to claim 1, wherein a ratio R of a groove area to a ground contact region of the tread portion when the pneumatic tire is inflated with air to a standard air pressure (700 kPa) and loaded with a standard load (617.81 kN) is such that $R \leq 0.35$.

8. A heavy duty pneumatic tire comprising:
a tread portion that is provided with a tread pattern, the tread pattern comprising:
a plurality of center lug grooves disposed at intervals in a tire circumferential direction that cross a tire equator line, the plurality of center lug grooves each comprising
a first end located in a half-tread region on a first side in a tire width direction of the tire equator line, and
a second end located in a half-tread region on a second side opposite the first side in the tire width direction;
a plurality of shoulder lug grooves disposed in each space between the plurality of center lug grooves in the tire circumferential direction in both of the half-tread regions,
each of the plurality of shoulder lug grooves extending outward in the tire width direction and comprising
an outer end in the tire width direction that opens to a ground contact edge on one side of respective opposite sides in the tire width direction, and
an inner end in the tire width direction located outward in the tire width direction of a position in the tire width direction of the respective first end or the second end;
a pair of circumferential primary grooves with a groove width less than that of the plurality of shoulder lug grooves, each of the pair of circumferential primary grooves being disposed in the respective half-tread regions and extending around an entire circumference of the pneumatic tire while alternately connecting to either one of the first end and the second end, and the inner end of each of the plurality of shoulder lug grooves in the tire width direction to form a wave-like shape;
a plurality of center blocks formed in a row in the tire circumferential direction and defined by the plurality of center lug grooves and the pair of circumferential primary grooves; and
a circumferential secondary groove disposed on the tire equator line around the entire circumference of the pneumatic tire that intersects the plurality of center lug grooves; wherein
a straight line that joins the first end and a first intersection portion where the center lug groove intersects a groove wall of the circumferential secondary groove on the first side has an inclination angle with respect to the tire circumferential direction ranging from 55° to 75°;
a straight line that joins the second end and a second intersection portion where the center lug groove intersects a groove wall of the circumferential secondary groove on the second side has an inclination angle with respect to the tire circumferential direction ranging from 55° to 75°;
a ratio of a groove width of the circumferential secondary groove to a maximum groove width of the center lug grooves ranges from 1.0 to 8.5; and
a relationship $0.30 \leq W3/T < W4/T \leq 0.60$ is satisfied, where W3 is an interval in the tire width direction between opposite ends of each of the center lug grooves, W4 is an interval in the tire width direction between the inner end in the tire width direction of each of the shoulder lug grooves disposed in one of the half-tread regions and the inner end in the tire width direction of each of the shoulder lug grooves disposed in the other half-tread region, and T is a tread width of the tread portion in the tire width direction.

9. The heavy duty pneumatic tire according to claim 1, wherein a rubber of an outermost portion of the tread portion in a tire radial direction has a ratio (tan δ) of loss modulus to storage modulus at 60° C. ranging from 0.04 to 0.2.

10. The heavy duty pneumatic tire according to claim 1, wherein each of the plurality of center blocks comprises corner portions formed corresponding to the wave-like shape of each of the pair of circumferential primary grooves, and the corners portions have obtuse angles.

11. The heavy duty pneumatic tire according to claim 1, wherein a groove width of the pair of circumferential primary grooves and a groove width of the plurality of center lug grooves range from 7 mm to 20 mm.

12. The heavy duty pneumatic tire according to claim 1, further comprising a closed groove extending in the tire width direction in regions on the ground contact edge side of the pair of circumferential primary grooves, wherein both ends of the closed groove are spaced apart from the pair of circumferential primary grooves and the plurality of shoulder lug grooves.

13. The heavy duty pneumatic tire according to claim 1, wherein the heavy duty pneumatic tire is mounted on a construction vehicle or an industrial vehicle.

14. The heavy duty pneumatic tire according to claim 1, wherein the plurality of center lug grooves each comprise
a first groove turning portion disposed on the first side that bends or curves protruding out toward a third side in the tire circumferential direction,
a second groove turning portion disposed on the second side that bends or curves protruding out toward a fourth side opposite the third side in the tire circumferential direction; and
an inclination angle with respect to the tire width direction of a first straight line that joins the first end and a protruding end where the first groove turning portion protrudes toward the third side in the tire circumferential direction and an inclination angle with respect to the tire width direction of a second straight line that joins the second end and a protruding end where the second groove turning portion protrudes toward the fourth side in the tire circumferential direction are greater than an inclination angle with respect to the tire width direction of a third straight line that joins the first end and the second end of each of the center lug grooves, the straight lines following center positions in a groove width direction of the center lug grooves.

15. A heavy duty pneumatic tire comprising:
a tread portion that is provided with a tread pattern, the tread pattern comprising:
a plurality of center lug grooves disposed at intervals in a tire circumferential direction that cross a tire equator line, the plurality of center lug grooves each comprising
a first end located in a half-tread region on a first side in a tire width direction of the tire equator line, and
a second end located in a half-tread region on a second side opposite the first side in the tire width direction;
a plurality of shoulder lug grooves disposed in each space between the plurality of center lug grooves in the tire circumferential direction in both of the half-tread regions,
each of the plurality of shoulder lug grooves extending outward in the tire width direction and comprising
an outer end in the tire width direction that opens to a ground contact edge on one side of respective opposite sides in the tire width direction, and
an inner end in the tire width direction located outward in the tire width direction of a position in the tire width direction of the respective first end or the second end;
a pair of circumferential primary grooves with a groove width less than that of the plurality of shoulder lug grooves, each of the pair of circumferential primary grooves being disposed in the respective half-tread regions and extending around an entire circumference of the pneumatic tire while alternately connecting to either one of the first end and the second end, and the inner end of each of the plurality of shoulder lug grooves in the tire width direction to form a wave-like shape;
a plurality of center blocks formed in a row in the tire circumferential direction and defined by the plurality of center lug grooves and the pair of circumferential primary grooves; and
a circumferential secondary groove disposed on the tire equator line around the entire circumference of the pneumatic tire that intersects the plurality of center lug grooves; wherein
a straight line that joins the first end and a first intersection portion where the center lug groove intersects a groove wall of the circumferential secondary groove on the first side has an inclination angle with respect to the tire circumferential direction ranging from 55° to 75°;
a straight line that joins the second end and a second intersection portion where the center lug groove intersects a groove wall of the circumferential secondary groove on the second side has an inclination angle with respect to the tire circumferential direction ranging from 55° to 75°;
a ratio of a groove width of the circumferential secondary groove to a maximum groove width of the center lug grooves ranges from 1.0 to 8.5; and
the plurality of center lug grooves each comprise
a first groove turning portion disposed on the first side that bends or curves protruding out toward a third side in the tire circumferential direction,
a second groove turning portion disposed on the second side that bends or curves protruding out toward a fourth side opposite the third side in the tire circumferential direction;
the first groove turning portion is provided at the first intersection portion; and
the second groove turning portion is provided at the second intersection portion.

\* \* \* \* \*